(12) United States Patent
Emmert et al.

(10) Patent No.: US 10,641,925 B2
(45) Date of Patent: May 5, 2020

(54) FORMULATION AND FITTING TECHNIQUES FOR WHOLE-ATMOSPHERE EMPIRICAL MODELS

(71) Applicant: The Government of the United States of America, as represented by the Secretary of the Navy, Arlington, VA (US)

(72) Inventors: John T. Emmert, Dumfries, VA (US); Douglas P. Drob, Alexandria, VA (US); Julian Michael Picone, Falls Church, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/440,092

(22) Filed: Jun. 13, 2019

(65) Prior Publication Data

US 2019/0383968 A1     Dec. 19, 2019

Related U.S. Application Data

(60) Provisional application No. 62/684,537, filed on Jun. 13, 2018.

(51) Int. Cl.
*G01W 1/16* (2006.01)
*G06F 17/11* (2006.01)
*G01W 1/10* (2006.01)
*G06F 111/10* (2020.01)

(52) U.S. Cl.
CPC ............... *G01W 1/16* (2013.01); *G01W 1/10* (2013.01); *G06F 17/11* (2013.01); *G06F 2111/10* (2020.01)

(58) Field of Classification Search
CPC . G01W 1/16; G01W 1/00; G01W 1/10; G06F 17/11
See application file for complete search history.

(56) References Cited

U.S. PATENT DOCUMENTS

2006/0080038 A1* 4/2006 Jakowski ............... G01S 19/14
702/2

* cited by examiner

*Primary Examiner* — Curtis B Odom
(74) *Attorney, Agent, or Firm* — US Naval Research Laboratory; William Ladd

(57) ABSTRACT

Systems and methods are provided for obtaining an empirical model of a planetary atmosphere as a function of the independent variables in a parametric formulation. Embodiments of the present disclosure can represent the temperature and individual species densities of the planetary atmosphere in the formulation, can robustly and efficiently carry out the computations needed to evaluate this formulation and to estimate the formulation's parameters, and can thereby obtain the empirical model of the planetary atmosphere.

20 Claims, 6 Drawing Sheets

FORMULATION AND FITTING TECHNIQUES FOR WHOLE-ATMOSPHERE EMPIRICAL MODELS

CROSS REFERENCE TO RELATED APPLICATIONS

This application claims the benefit of U.S. Provisional Patent Application No. 62/684,537, filed on Jun. 13, 2018, which is incorporated by reference herein in its entirety.

FIELD OF THE DISCLOSURE

This disclosure relates to planetary atmospheric models, including whole Earth atmospheric models.

BACKGROUND

Both public and private organizations require accurate specification of the Earth's atmosphere at a given time or under specified input conditions. Applications include, but are not limited to: (a) planning of travel and other enterprises; (b) orbit determination and prediction of space objects in low-Earth-orbit or ballistic trajectories; (c) space object re-entry prediction (including for new commercial space tourism endeavors); and (d) radiowave absorption and propagation calculations for radars, communication, and geolocation.

Numerical Weather Prediction (NWP) systems routinely provide near-real-time specification and forecasts of the lower atmosphere (below about 50 km altitude), but no NWP system exists for the upper atmosphere (above 50 km), primarily because of the lack of regular, reliable global measurements and the immaturity of upper atmospheric models that solve the fundamental dynamical equations of physics and chemistry. Instead, empirical models are widely used for upper atmospheric specification and prediction.

Empirical atmosphere models specify key properties of the atmosphere (e.g., temperature, density) as a function of input conditions (e.g., location, day of year, etc.), consistent with available historical measurements. They are also accurately called climatological models, because they describe the average state of the atmosphere under specified conditions. In the upper atmosphere, the traditional concept of 'climatology' is extended to include the average response of the atmosphere to short-term variations in extreme ultra violet energy flux from the Sun, to which the upper atmosphere is very sensitive.

Although empirical models of Earth's atmosphere are most commonly used for upper atmospheric specification, they are also used in numerous lower atmospheric applications. Their compact encapsulation of measurement-based climatology provides a fast means of specifying the atmosphere when time-specific NWP is not necessary or desirable. Empirical models are used in the lower atmosphere, for example, in the estimation of exposure to harmful solar and galactic radiation during commercial aviation flights. Furthermore, NWP is not available for the atmospheres of other planets, and empirical whole-atmosphere models are therefore used in planetary exploration and scientific research.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
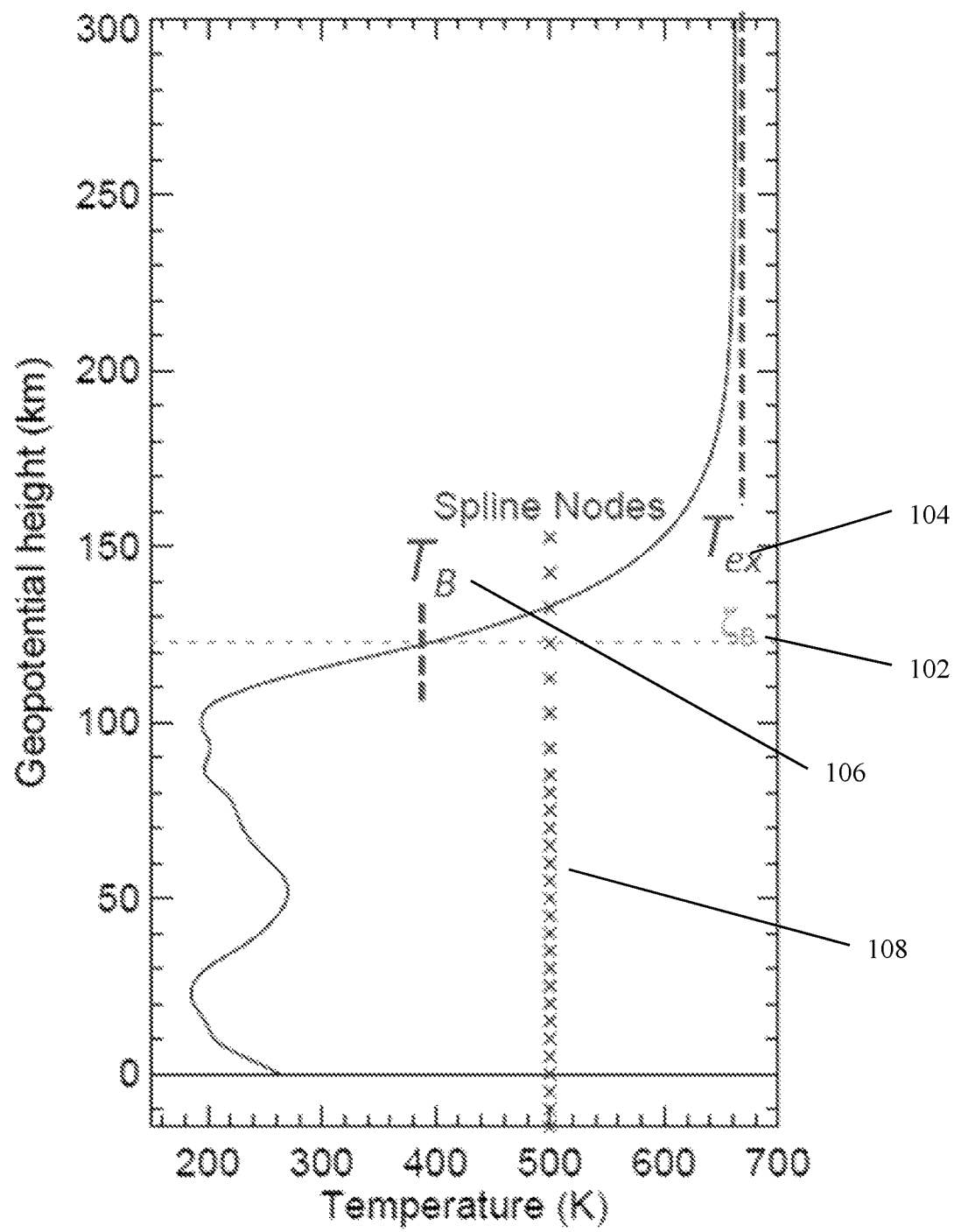
FIG. 1 is a diagram of an example of a fitted temperature profile in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. OVERVIEW

Whole Earth atmospheric models are used, for example, for planning and monitoring of performance characteristics of satellite, telescope, laser, and other platforms. Embodiments of the present disclosure provide systems and methods that enable better modeling of a planetary atmosphere than prior systems and techniques. For example, prior empirical model systems used different models for different parts of the atmosphere and weighted averages for transition areas. Embodiments of the present disclosure can provide a useful comprehensive statistical representation of available upper atmosphere observations. Embodiments of the present disclosure can use a single seamless model for the whole atmosphere that is more accurate below ~90 km and very similar above.

Embodiments of the present disclosure provide systems and methods for representing the temperature and individual species densities of an entire planetary atmosphere, from the ground to outer space, in a parametric formulation with key physical constraints. Embodiments of the present disclosure can be used to robustly and efficiently carry out the computations needed to evaluate this formulation and to estimate the formulation's parameters, for example, via assimilation of historical observations. Embodiments of the present disclosure can use this formulation to obtain an empirical model of the atmosphere as a function of the independent variables.

Embodiments of the present disclosure can generate a formulation that determines how to represent data. For example, in an embodiment, spherical harmonics are used that are modulated in time and are expanded in polynomials in the vertical direction. Embodiments of the present disclosure can estimate key parameters set by the formulation and can tune the key parameters to received data.

Embodiments of the present disclosure can accurately handle transitions from fully mixed elements (e.g., present at the Earth's surface) to diffusive elements present at high altitudes. For example, in an embodiment, a mass function in the formulation identifies a continuous transition from mixed to diffusive elements along the transition based on an empirical solution that satisfies differential equations for variations among each major species in the air (e.g., He, O, $N_2$, $O_2$, and H).

Using spline matching, embodiments of the present disclosure provide temperature solutions with C2 continuity, which is important for wave propagation and/or acoustic calculations. Using a global gravitational potential height calculation, embodiments of the present disclosure avoid having to account for how gravity varies by latitude, longitude, and/or altitude. Further, embodiments of the present disclosure can use a data collator that can weight data from a plurality of data sources (e.g., based on statistical significance of data from each source).

2. EXEMPLARY EMPIRICAL MODELS

There are three series of empirical models of temperature and density (which are closely related, as described below) for Earth's atmosphere. The latest versions of these models are the NRL Mass Spectrometer and Incoherent Scatter Radar Extended 2000 (NRLMSISE-00®; the name refers to the types of measurements originally used in the model), Jacchia-Bowman 2008 (JB2008), and Drag-Temperature Model 2013 (DTM-2013). JB2008 and DTM-2013 are limited to altitudes above 120 km and only describe temperature and total mass density; thus, these models cannot be used in lower atmosphere, orbital reentry, or radio wave propagation applications. NRLMSISE-00 represents the whole atmosphere down to the ground and additionally specifies the concentrations of individual atmospheric constituents. Above 120 km, the three models take similar approaches to the representation of the atmosphere.

NRLMSISE-00 specifies a vertical atmospheric temperature profile in four segments: 0-32.5 km, 32.5-72.5 km, 72.5-120 km, and >120 km. In the lowest three segments, the inverse temperature is a cubic spline interpolation between temperature values at fixed nodes. In the upper segment, the temperature relaxes to an asymptotic value ('exospheric temperature') following an exponential Bates profile. At the junction altitudes, the temperature and its vertical gradient is matched, so that the profile is C1 continuous (i.e., there are no discontinuities in the profile or its first derivative).

To estimate density, NRLMSISE-00 uses two overlapping profiles. The lower profile assumes that the atmosphere is fully mixed and in hydrostatic equilibrium (gravity balanced by pressure), and the upper profile assumes that the atmosphere is diffusively separated, with each constituent in individual hydrostatic equilibrium following its own scale height according to its mass. In the transition region (~80-250 km altitude), a weighted average of the two profiles is computed. For species that are chemically reactive (such as atomic and molecular oxygen), additional corrections are applied to the density profile.

Each parameter that describes an NRLMSISE-00 vertical temperature and density parameter is expanded as a function of: spherical harmonics in latitude and local time; Fourier harmonics in longitude, Universal Time, and day of year; and polynomials in solar activity and geomagnetic activity indices. This expansion results in a global formulation described by 1300 parameters that are estimated from data. A relatively small, randomly selected subset of available historical observations is fitted to the formulation via a nonlinear least-squares estimation procedure to obtain the set of parameter values that define a particular version of the model. The user is provided with these parameter values along with code (e.g., FORTRAN77 code) that encapsulates the formulation. This end-user code applies the parameter values to the formulation and evaluates the model for the input conditions specified by the user. Note that the user does not require the actual data or the much more complex data assimilation algorithms used to estimate the model parameters.

The NRLMSISE-00 approach has several critical limitations. For example, its merging of separate fully mixed and diffusively separated density profiles is not robust and in some cases produces discontinuous output density profiles or density that unrealistically increases with altitude. Further, the model formulation cannot represent regions where species densities are decoupled from temperature, such as the region below 80 km where atomic oxygen and atomic hydrogen density is chemistry-dominated. Additionally, the vertically segmented formulation assumes that each region is physically isolated, but research has shown that there is strong vertical coupling throughout the atmosphere. Also, some applications may require C2 continuity in temperature (i.e., no discontinuities through the 2nd derivative with respect to altitude), but NRLMSISE-00 is only C1 continuous. Additionally, the fitting procedure is only capable of assimilating a relatively small amount of data, potentially resulting in an inaccurate fit, and the uncertainties of the model parameters are not well characterized.

3. EXEMPLARY FORMULATION FOR PLANETARY EMPIRICAL WHOLE-ATMOSPHERE MODEL

In an embodiment, a vertical temperature profile as a function of gravitational potential height $\zeta$) can be represented by Equation (1):

$$\frac{1}{T(\zeta)} = U(\zeta) = \begin{cases} \{T_{ex} - (T_{ex} - T_B)\exp[-\sigma(\zeta - \zeta_B)]\}^{-1}; \zeta \geq \zeta_B \\ \sum_{i=0}^{N_T} \alpha_i S_i(\zeta); \zeta < \zeta_B \end{cases} \quad (1)$$

In Equation (1) above, $\zeta$ is the gravitational potential height (known as geopotential height for Earth), and $T(\zeta)$ is the temperature profile as a function of gravitational potential height. In Equation (1), $\zeta_B$ is the Bates reference gravitational potential height and joining height. In Equation (1), the upper portion of the profile (e.g., above $\zeta_B$, which is typically set to ~120 km) is the Bates temperature profile (described by model paramters $T_{ex}$, $T_B$, and $\sigma$), and the lower portion is a linear combination of cubic B-spline basis functions (described by $N_T+1$ parameters $\alpha_i$ for a preselected set of $N_T+5$ nodes). In an embodiment, the two portions are joined such that the profile is C2-continuous, which imposes three constraints on the parameters (continuity of temperature, its first derivative, and its second derivative $\zeta_B$). Thus, there are $N_T+1$ free parameters that describe the temperature profile. In an embodiment, the other terms in the profile (the spine node locations and $\zeta_B$) are chosen a priori.

Specifically, in Equation (1), $T_{ex}$ is the exospheric temperature (profile parameter), and $T_B = T(\zeta_B)$ is the temperature at $\zeta_B$. In Equation (1), $S_i$ represents cubic B-splines with nodes at gravitational potential heights $\zeta_{T,i}$; $i = 0, 1, \ldots, N_T+4$, where $N_T+1$ is the number of B-spline basis functions. In Equation (1), $\alpha_i$ represents coefficients on B-spline basis functions (profile parameters). In Equation (1), $\sigma$ is the shape parameter (profile parameter) and can be represented by Equation (1.1):

$$\sigma = \frac{T'_B}{(T_{ex} - T_B)} \quad (1.1)$$

where:

$$T'_B = \frac{dT}{d\zeta}\bigg|_{\zeta = \zeta_B} \quad (1.2)$$

In an embodiment, a vertical density profile for a given species can be represented by Equation (2):

$$\ln n(\zeta) = \begin{cases} \ln n_0 - \frac{g_0}{k} \int_{\zeta_0}^{\zeta} \frac{M(\zeta')}{T(\zeta')} d\zeta' - \ln \frac{T(\zeta)}{T(\zeta_0)} - \\ Ce^{-\frac{(\zeta - \zeta_C)}{H_C}} - \frac{R}{1 + e^{-\frac{(\zeta - \zeta_R)}{H_R}}} \quad ; \zeta \geq \zeta_S \\ \sum_{i=1}^{N_d} \alpha_{d,i} S_{d,i}(\zeta); \quad \zeta \leq \zeta_S \end{cases} \quad (2)$$

In an embodiment, in Equation (2) above, the upper portion of the profile (e.g., for $\zeta \geq \zeta_S$) is the thermospheric portion (e.g., for altitudes above 120 km), and the bottom portion of the profile (e.g., for $\zeta \leq \zeta_S$) is for lower atmospheres. In Equation (2) above, the upper portion of the profile (e.g., for $\zeta \geq \zeta_S$), which can be called the 'hydrostatic profile,' consists of five terms (e.g., as written here in log space; the terms are additive): a reference density, the hydrostatic term containing an integral of the temperature, the ideal gas law, bottomside chemical loss, and topside chemical/dynamical correction. In an embodiment, the last two terms are not applicable to chemically inert species, for which the coefficients C and R are set to zero.

In an embodiment, in Equation (2) above, the bottom portion of the profile (e.g., for $\zeta \leq \zeta_S$) provides cubic splines for chemistry-dominated regions. For example, in an embodiment, the bottom portion is optional and applies to species whose densities are dominated by chemistry and are independent of temperature. The bottom portion can be called the 'spline profile,' which is a linear combination of cubic B-spline basis functions (described by $N_d$ parameters $\alpha_d$ for a preselected set of $N_d+4$ nodes). In an embodiment, the two portions are joined such that the profile is either C1 or C2 continuous, which imposes two or three constraints, respectively, on the parameters.

Specifically, in Equation (2) above, $n(\zeta) = n(\zeta_0)$ is the number density of a particular species (e.g., He, O, $N_2$, $O_2$, and H) as a function of altitude, $n_0 = n(\zeta_0)$ is the reference density (profile parameter). In Equation (2), $\zeta_0$ is the reference gravitational potential height, $g_0$ is the reference gravitational acceleration at surface, k is the Boltzmann constant, and $M(\zeta)$ is the effective mass profile. In Equation (2), $\zeta_S$ represents joining potential height between spline and hydrostatic profiles, $\alpha_{d,i}$ represents coefficients on B-spline basis functions (profile parameters), and $S_{d,i}$ represents cubic B-splines with nodes at gravitational potential heights $\zeta_{d,i}$; $i = 1, 2, \ldots, N_d+4$, where $N_d$ is the number of B-spline basis functions. In Equation (2), chemical loss term and the chemical/dynamical correction term (e.g., representing photodissociation loss) are shown below in Equations (2.1) and (2.2), respectively:

$$\text{Chemical Loss term} = Ce^{-\frac{(\zeta - \zeta_C)}{H_C}} \quad (2.1)$$

$$\text{Chemical/Dynamical Correction Term} = \frac{R}{1 + e^{-\frac{(\zeta - \zeta_R)}{H_R}}} \quad (2.2)$$

In an embodiment, in Equation (2), the effective mass profile $M(\zeta)$ can be chosen to represent any departure from hydrostatic equilibrium (M is vertically constant under hydrostatic equilibrium), while still retaining coupling with the temperature profile, via the integral term and the ideal gas law term. To represent the transition from a fully mixed atmosphere to diffusive separation, a generalized logistic function defined by 5 parameters can be adopted, as shown by Equation (3):

$$M(\zeta) = M_0 + \frac{M_1 - M_0}{[1 + e^{-(\zeta - \zeta_M/H_M)}]^{\gamma_M}} \quad (3)$$

In Equation (3), $M_0$ is the lower asymptote (profile parameter), $M_1$ is the upper asymptote (profile parameter), $\zeta_M = \zeta_{M_c} + H_M \ln(2^{1/\gamma} - 1)$, where $\zeta_{M_c}$ is the altitude of the midpoint (profile parameter), $H_M$ is the scale height (profile parameter), and $\gamma_M$ is the asymmetry factor (profile parameter). In an embodiment, $M(\zeta_{M_c})$ is determined by Equation (3.1):

$$M(\zeta_{M_c}) = M_0 + \frac{M_1 - M_0}{2} \quad (3.1)$$

In an embodiment, the lower asymptote $M_0$ is set to the mean molecular mass of the fully mixed atmosphere (~29 amu for Earth), and the upper asymptote $M_1$ is set to the actual mass of the species (e.g., 16 amu for an atomic oxygen profile). Thus, in an embodiment, there are three free parameters in the effective mass profile. Together with Equation (4), up to $N_d+8$ free parameters can be required, along with the temperature parameters, to describe a density profile.

In an embodiment, to compute gravitational potential height, a truncated expansion, in spherical coordinates, of the global gravitational potential is used in Equation (4):

$$\zeta = \frac{U - U_0}{g_0} \qquad (4)$$

In Equation (4), $U_0$ is the reference gravitational potential at the surface, and $g_0$ is the reference gravitational acceleration at the surface. $U(r, \phi_{gc})$ is given by Equation (4.1):

$$U(r, \phi_{gc}) = -\frac{GM}{r}\left[1 - \frac{1}{2}J_2\frac{a^2}{r^2}(3\sin^2\phi_{gc} - 1) + \frac{1}{2}\omega^2 x^2\right] \qquad (4.1)$$

In Equation (4.1), r is the distance from the center of the planet (input variable), $\phi_{gc}$ is the geocentric latitude (input variable; angle measured from equatorial plane), G is the gravitational constant, M is the mass of the planet, $J_2$ is the second harmonic of the potential field, $\alpha$ is the equatorial radius of the planet, $\omega$ is the rotational angular velocity of the planet, and $x=r \cos(\phi_{gc})$. In an embodiment, the parameters M, $J_2$, $\alpha$, and $\omega$ are supplied a priori by external analyses of gravitational field measurements of planetary bodies.

In an embodiment, each of the temperature and density vertical profile free parameters in Equations (1)-(3) above can be expanded as a function of horizontal position, time, solar activity, and geomagnetic activity (additional variables can be added) in Equation (5):

$$P=P_0[1+f(\phi,\lambda,LT,UT,d,A_s,A_m)] \qquad (5)$$

In Equation (5), P is a given vertical profile parameter, $P_0$ is the global average reference value of P, $f$ is a parametric function of input variables, $\phi$ is the latitude, $\lambda$ is the longitude, LT is the local solar time, UT is the universal time, d is the day of the year, $A_s$ is solar activity, and $A_m$ is magnetic activity.

FIG. 1 is a diagram of an example of a fitted temperature profile in accordance with an embodiment of the present disclosure. In FIG. 1, $\zeta$ is the gravitational potential potential height, and $\zeta_B$ 102 is the Bates reference potential height and joining height. In FIG. 1, $T_{ex}$ 104 is the exospheric temperature, and $T_B=T(\zeta_B)$ is the temperature at $\zeta_B$. Further, in FIG. 1, nodes 108 for cubic B-splines in the lower atmosphere are shown. Using these parameters, the fitted temperature profile of FIG. 1 can be generated using the equations described above. Embodiments of the present disclosure can advantageously be C2 continuous (e.g., provide continuous functions through the second derivative), can use cubic B-splines in the lower atmosphere, and can use gravitational potential height instead of geometric height.

Figure 2:
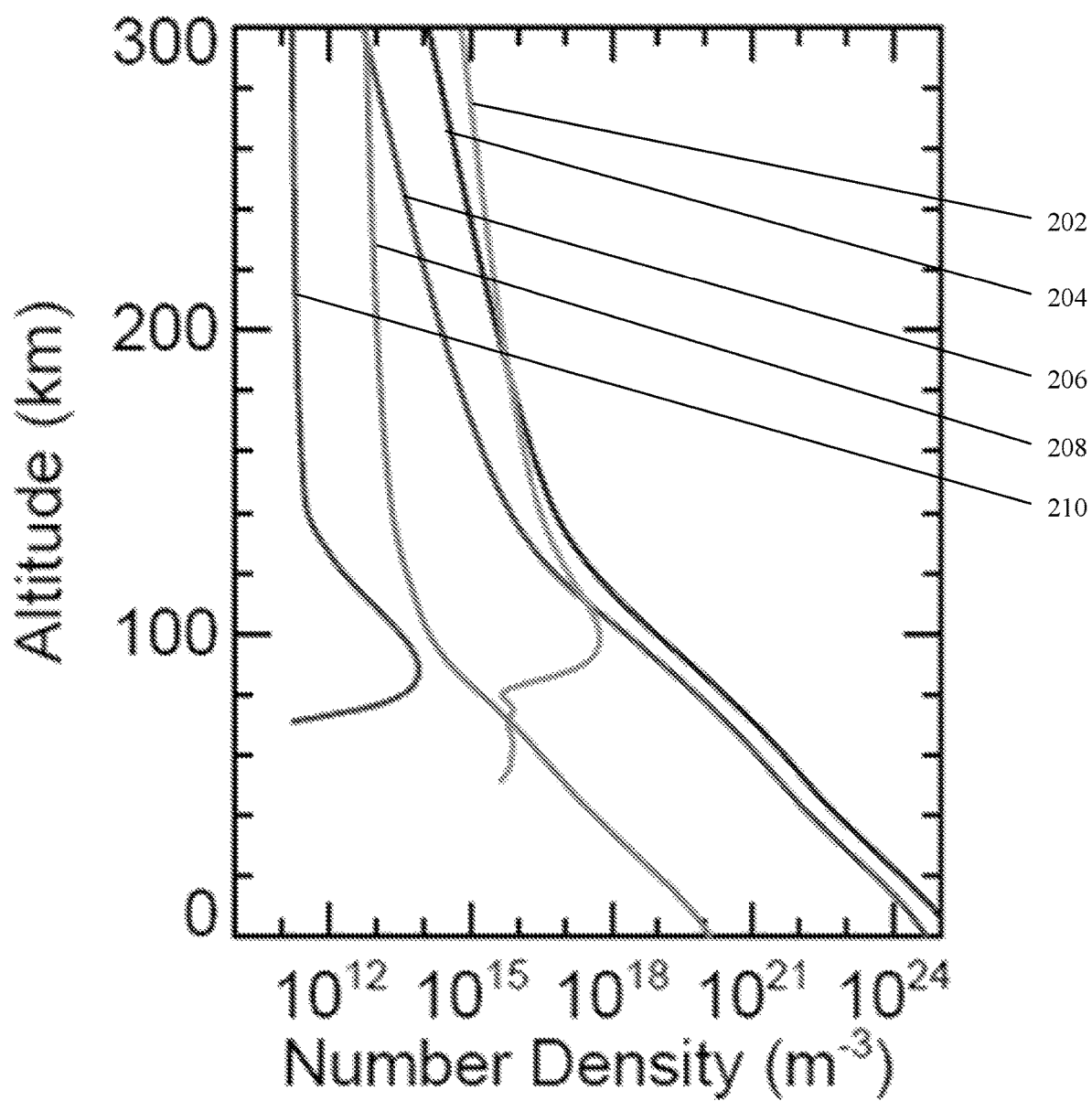
FIG. 2 is a diagram of an example of fitted density profiles in accordance with an embodiment of the present disclosure.

FIG. 2 is a diagram of an example of fitted density profiles in accordance with an embodiment of the present disclosure. FIG. 2 shows fitted density profiles for atomic Oxygen (O) 202, molecular Nitrogen ($N_2$) 204, molecular Oxygen ($O_2$) 206, Helium (He) 208, and Hydrogen (H) 210. Embodiments of the present disclosure provide an effective mass parameter that enables seamless transition from a mixed atmosphere to diffusive separation. Further, embodiments of the present disclosure provide B-splines for chemistry dominated regions (decoupled from temperature) of species like O 202 and H 210 and provide a physically realistic chemical loss term.

4. EXEMPLARY COMPUTATION FOR PLANETARY EMPIRICAL WHOLE-ATMOSPHERE MODEL

In an embodiment, the vertical profile formulation described above in Equations (1)-(3) requires computation of the integral term in Equation (2). For robustness and computational speed, it can be desirable that this term be calculable in closed form, rather than using numerical integration. To achieve this property, a six-segment piecewise linear effective mass profile can be defined, as an alternative to Equation (3), in Equation (6) below:

$$M(\zeta) \equiv \begin{cases} M_0; \zeta \leq \zeta_{M,0} \\ M_1 + (\zeta - \zeta_{M,i})a_i; \zeta_{M,i} \leq \zeta \leq \zeta_{M,i+1}; i = 0, 1, 2, 3 \\ M_4; \zeta \geq \zeta_{M,4} \end{cases} \qquad (6)$$

In Equation (6), $\alpha_i$ can be represented by Equation (6.1) below:

$$a_i \equiv \frac{M_{i+1} - M_i}{\zeta_{M,i+1} - \zeta_{M,i}} = \text{slope of segment } i; i = 0, 1, 2, 3 \qquad (6.1)$$

In an embodiment, the piecewise function is constrained to approximately follow the logistic function of Equation (3), so that the piecewise profile is similarly defined by 5 parameters, 2 of which are fixed a priori, as shown in Equations (7.1)-(7.5) below:

$$M_0 = \overline{M}; \zeta_{M,0} = \zeta_M - 2H_{ML} \qquad (7.1)$$

$$M_1 = \frac{M_s + \overline{M}}{2} - \frac{M_s - \overline{M}}{2}\tanh(1); \zeta_{M,1} = \zeta_M - H_{ML} \qquad (7.2)$$

$$M_2 = \frac{M_s + \overline{M}}{2}; \zeta_{M,2} = \zeta_M \qquad (7.3)$$

$$M_3 = \frac{M_s + \overline{M}}{2} + \frac{M_s - \overline{M}}{2}\tanh(1); \zeta_{M,3} = \zeta_M + H_{MU} \qquad (7.4)$$

$$M_4 = M_s; \zeta_{M,4} = \zeta_M + 2H_{MU} \qquad (7.5)$$

In Equations (7.1)-(7.5) above, $\overline{M}$ is the mass in the fully mixed region (e.g., in an embodiment, fixed a priori), $M_s$ is the species mass (e.g., in an embodiment, fixed a priori), $\zeta_M$ is the transition, or "turbopause" height (free parameter), $H_{ML}$ is the scale height of the lower portion (free parameter), and $H_{MU}$ is the scale height of the upper portion (free parameter).

Figure 3:
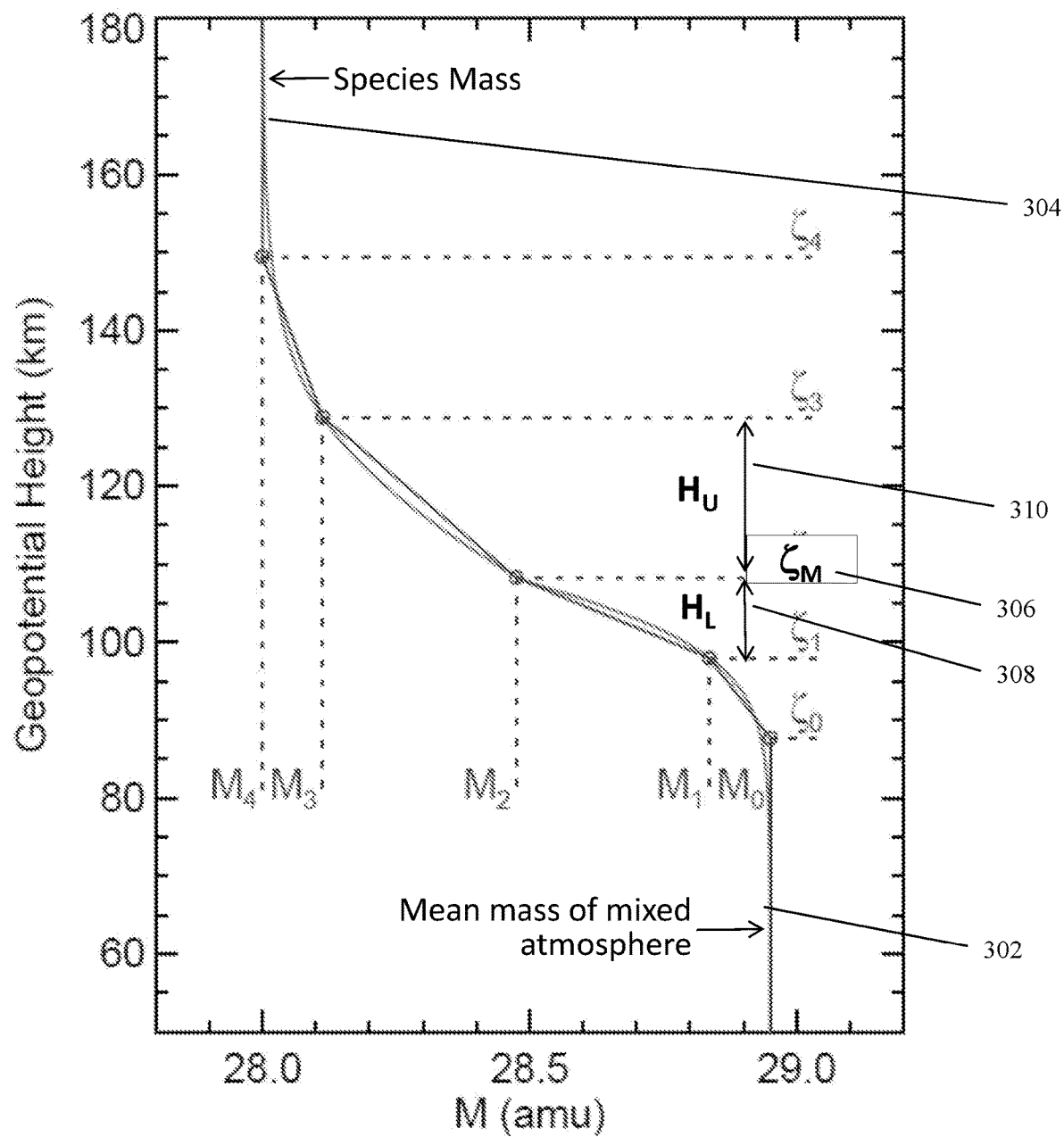
FIG. 3 is a diagram of an exemplary piecewise linear effective mass profile in accordance with an embodiment of the present disclosure.

FIG. 3 is a diagram of an exemplary piecewise linear effective mass profile in accordance with an embodiment of the present disclosure. Specifically, FIG. 3 shows an exemplary effective mass profile for molecular nitrogen ($N_2$). FIG. 3 shows the mean mass of the mixed atmosphere 302 and the species mass 304. The profile of FIG. 3 has three free parameters: $\zeta_M$ (the altitude of the halfway point) 306, the scale height of the lower part $H_L$ 308, and the scale height of the upper part $H_U$ 310.

With the formulation of Equation (7), in an embodiment, the integral of Equation (2) can be expressed in closed form, via integration by parts, as shown in Equation (8) below:

$$\int \frac{M(x)}{T(x)} dx = M(x)V(x) - \begin{cases} 0; x \leq \zeta_{M,0} \\ a_0 W(x) - a_0 W_0; \zeta_{M,0} \leq x \leq \zeta_{M,1} \\ a_1 W(x) - (a_0 W_0 + a_1 W_1) + a_0 W_1; \zeta_{M,1} \leq x \leq \zeta_{M,2} \\ a_2 W(x) - (a_0 W_0 + a_1 W_1 + a_2 W_2) + a_0 W_1 + a_1 W_2; \zeta_{M,2} \leq x \leq \zeta_{M,3} \\ a_3 W(x) - (a_0 W_0 + a_1 W_1 + a_2 W_2 + a_3 W_3) + a_0 W_1 + a_1 W_2 + a_2 W_3; \\ \quad \zeta_{M,3} \leq x \leq \zeta_{M,4} \\ -(a_0 W_0 + a_1 W_1 + a_2 W_2 + a_3 W_3) + a_0 W_1 + a_1 W_2 + a_2 W_3 + a_3 W_4; \\ \quad x \geq \zeta_{M,4} \end{cases} \quad (8)$$

The terms $V(x)$ and $W(x)$ referenced in Equation (8) are defined by Equations (8.1) and (8.2) below:

$$V(x) = \begin{cases} V_S(x) = \sum_{i=0}^{N_T-1} \beta_i S_{i,5}(x) + c_{V_S}; x < \zeta_B \\ V_B(x) = \frac{1}{T_{ex}} \left[ (x - \zeta_B) + \frac{1}{\sigma} \ln \frac{T(x)}{T_{ex}} \right] + c_{V_B}; x \geq \zeta_B \end{cases} \quad (8.1)$$

$$W(x) = \begin{cases} W_S(x) = \sum_{i=0}^{N_T-1} \gamma_i S_{i,6}(x) + c_{V_S}(x - \zeta_B) + c_{W_S}; x < \zeta_B \\ W_B(x) = \frac{1}{T_{ex}} \left[ \frac{1}{2}(x - \zeta_B)^2 + \frac{1}{\sigma} Li_2(be^{-\sigma(x-\zeta_B)}) \right] + \\ \quad c_{V_B}(x - \zeta_B) + c_{W_B}; x \geq \zeta_B \end{cases} \quad (8.2)$$

In Equation (8), $W_i = W(\zeta_{M,i})$. The terms $c_{V_S}$, $c_{V_B}$, $c_{W_S}$, and $c_{W_B}$ referenced in Equations (8.1) and (8.2) are defined by Equations (8.3)-(8.6) below:

$$c_{V_S} = \sum_{i=0}^{N_T-1} \beta_i S_{i,t}(\zeta_B) \quad (8.3)$$

$$c_{V_B} = -\frac{\ln(1-b)}{\sigma T_{ex}} \quad (8.4)$$

$$c_{V_S} = \sum_{i=0}^{N_T-1} \gamma_i S_{i,6}(\zeta_B) \quad (8.5)$$

$$c_{V_S} = -\frac{Li_2(b)}{\sigma T_{ex}} \quad (8.6)$$

In Equations (8.1)-(8.6) above, the following terms are defined by Equations (8.7)-(8.9).

$$\beta_0 = \frac{\alpha_0(\zeta_{T,4} - \zeta_{T,0})}{4} \quad (8.7)$$

$$\beta_i = \beta_{i-1} + \frac{\alpha_i(\zeta_{T,i+4} - \zeta_{T,i})}{4} \quad (8.8)$$

$$\gamma_0 = \frac{\beta_0(\zeta_{T,5} - \zeta_{T,0})}{5} \quad (8.7)$$

$$\gamma_i = \gamma_{i-1} + \frac{\beta_i(\zeta_{T,i+5} - \zeta_{T,i})}{5} \quad (8.8)$$

$$b = 1 - \frac{T_B}{T_{ex}} \quad (8.9)$$

In Equations (8.1)-(8.9) above, $S_{i,5}(x)$ represents fifth order B-splines for nodes $\{\zeta_{T,i}\}$, $S_{i,6}(x)$ represents sixth order B-splines for nodes $\{\zeta_{T,i}\}$, and $Li_2(x)$ is the dilogarithm function.

5. EXEMPLARY PARAMETER ESTIMATION FOR PLANETARY EMPIRICAL WHOLE-ATMOSPHERE MODEL

Figure 4:
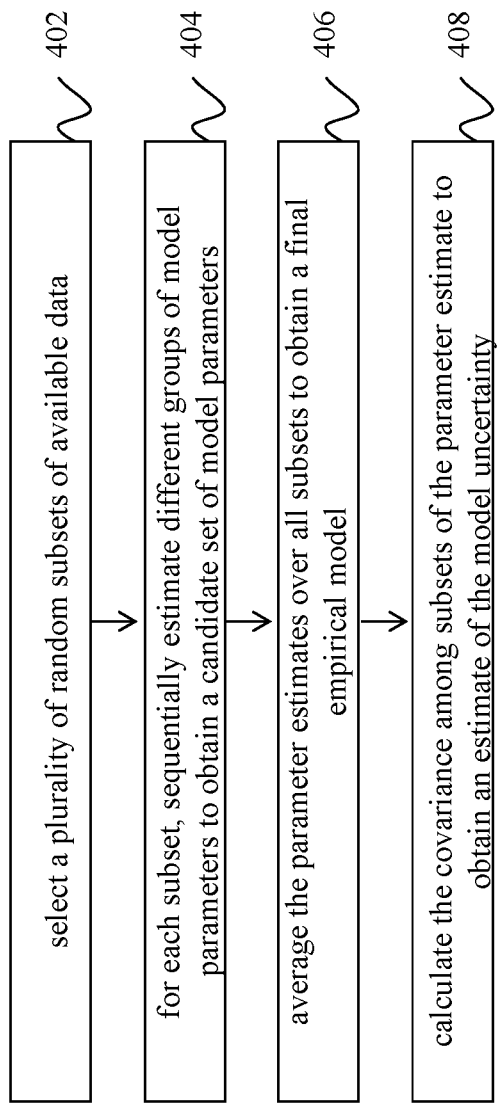
FIG. 4 is a flowchart of an exemplary method for estimating free parameters in accordance with an embodiment of the present disclosure.

In an embodiment, free parameters in Equations (1), (2), (3), (5), and (6) can be estimated by assimilating historical atmospheric data using a least-squares algorithm, such as a Levenberg-Marquardt (LM) non-linear least-squares algorithm. FIG. 4 is a flowchart of an exemplary method for estimating free parameters in accordance with an embodiment of the present disclosure. In step 402, a plurality of random subsets of available data are selected. For example, in an embodiment, which can be called "sequential ensemble estimation," $N_s$ random, mutually exclusive subsets of the available data can be selected.

In step 404, for each subset, different groups of model parameters are sequentially estimated to obtain a candidate set of model parameters. For example, in an embodiment for each subset ("ensemble member"), different groups of model parameters can be sequentially estimated by applying LM to the types of data appropriate for each group (e.g., temperature parameters can be influenced by both density and temperature data), to obtain a candidate set of model parameters.

In step 406, the parameter estimates are averaged over all subsets to obtain a final empirical model. For example, in an embodiment, the parameter estimates can then be averaged over all ensemble members to obtain a final empirical model. In optional step 408, the covariance among subsets of the parameter estimate can be calculated to obtain an estimate of the model uncertainty. For example, in an embodiment, the covariance (among the ensemble members) of the parameter estimates can be calculated to obtain an estimate of the model uncertainty.

Embodiments of the present disclosure allow all available historical data (>$10^8$ observations) to contribute to robust and accurate model parameter estimates. NRLMSISE-00, for example, is based on a single fit of a subsample of only a few thousand points. Embodiments of the present disclosure more fully explore nonlinear parameter space for optimal solutions and eliminate contamination from biases among the ensemble members and data sets.

6. EXEMPLARY ADVANTAGES

Embodiments of the present disclosure have several advantages over prior systems, such as NRLMSISE-00 (and, for the thermosphere, JB2008 and DTM-2013). For example, embodiments of the present disclosure can use a variable effective mass profile inside the hydrostatic integral is novel and can permit a seamless representation of whole-atmosphere species densities. Embodiments of the present disclosure can allow perturbations away from hydrostatic equilibrium while still representing the strong influence of temperature (and pressure) on species density profiles.

The choice of a piecewise linear effective mass profile approximating a logistic function in accordance with an embodiment of the present disclosure provides a realistic representation of the transition from a fully mixed atmosphere to diffusive separation, while permitting a robust and computationally efficient closed-form solution for a density profile. In an embodiment, the introduction of a portion of the density profile that is decoupled from temperature permits the representation of trace species whose densities are governed primarily by chemistry rather than thermodynamics.

In an embodiment, the imposition of C2 continuity in temperature throughout the atmosphere allows the robust use of the model as a background for simulation of small-scale wave dynamics. In contrast, for example, the C1 continuity of NRLMSISE-00 can produce instabilities in the application of the internal buoyancy wave equations, when NRLMSISE-00 is used as the background atmosphere.

In an embodiment, the use of a global gravitational potential height function as the vertical coordinate of the model provides a simpler and more robust representation of gravitational potential differences, especially with respect to latitudinal variations of gravity. In contrast, in NRLMSISE-00, JB2008, and DTM-2013 represent gravitational potential differences with respect to fixed geometric altitudes, which forces these models to artificially absorb latitudinal gravity variations into their horizontal expansion functions.

In an embodiment, the sequential ensemble estimation procedure allows all available historical data to contribute to robust and accurate model parameter estimates. Historical measurements number in the hundreds of millions. In an embodiment, only a relatively small subset can be assimilated in a single fit (because the formulation is nonlinear with respect to the parameters). NRLMSISE-00, for example, is based on a single fit of a subsample of only a few thousand points.

7. EXEMPLARY ALTERNATIVES

Equations (3) and (6) show specific forms of the effective mass profile designed to represent the monotonic transition from a fully mixed atmosphere to a diffusively separated atmosphere. However, other forms could be chosen that still fulfill the novel purpose of the mass profile of representing departures from hydrostatic equilibrium without completely decoupling the density profile from pressure or temperature.

The mass profile formulation given in equation (6) can produce a density profile that is C1 continuous. In an embodiment, a quadratic piecewise polynomial mass profile could be implemented to produce a C2 continuous density profile while still enabling a closed-form solution to the hydrostatic integral term. In an embodiment, the solution involves higher-order terms than are included in equation (8).

In equation (2), the parameters of the spline and hydrostatic portions of a density profile can be constrained to produce either C1 or C2 continuity, as desired. Although embodiments of the present disclosure are primarily motivated by the need to represent Earth's atmosphere, the embodiments of the present disclosure can be equally applicable to the atmospheres of other bodies (e.g., other planets, moons, etc.).

8. EXEMPLARY SYSTEMS FOR CREATING AND USING ATMOSPHERIC MODELS

Figure 5:
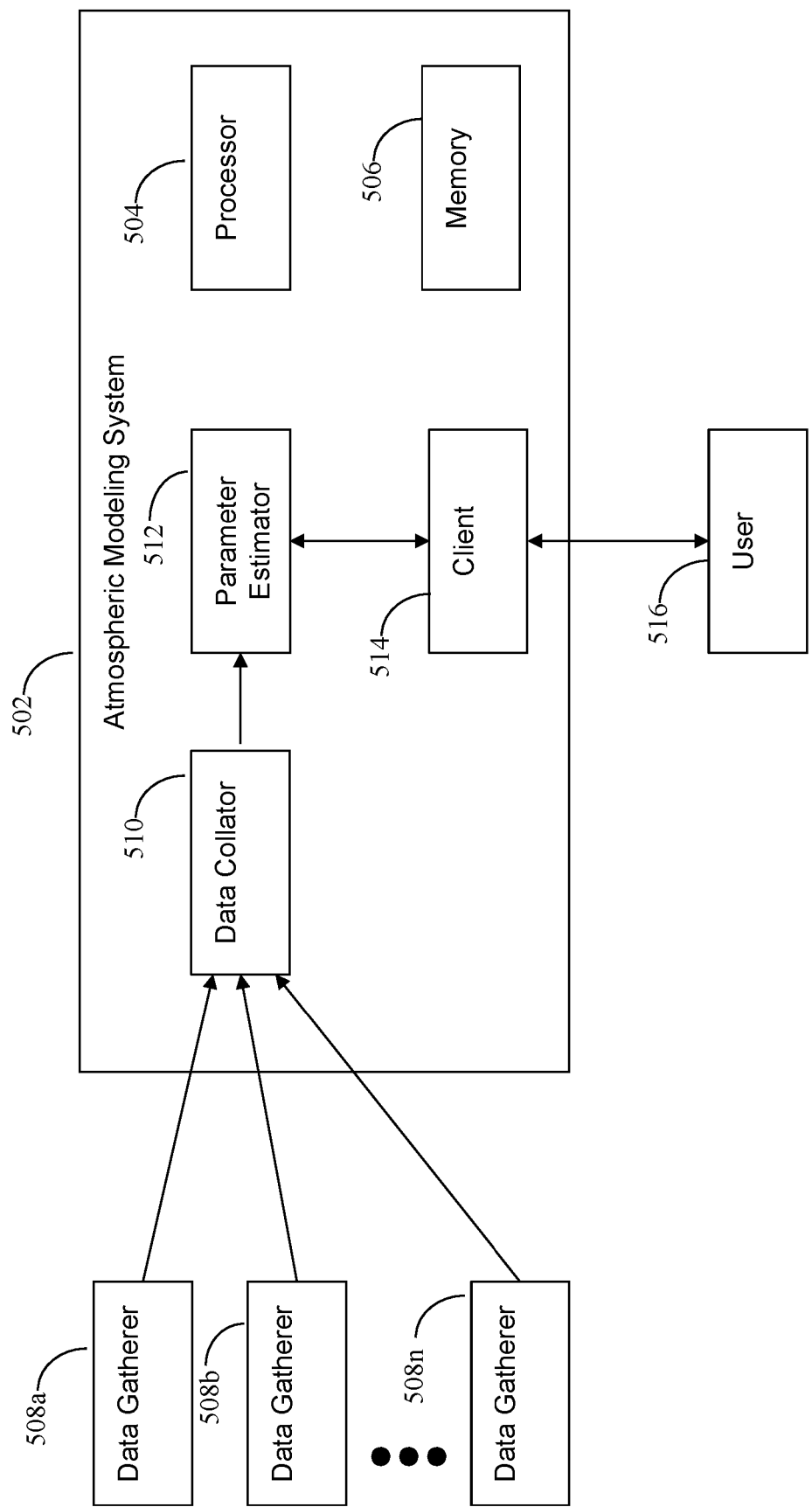
FIG. 5 is a diagram of an exemplary atmospheric modeling system in accordance with an embodiment of the present disclosure.

FIG. 5 is a diagram of an exemplary atmospheric modeling system 502 in accordance with an embodiment of the present disclosure. In an embodiment, atmospheric modeling system 502 can include a processor 504 and a memory 506. In an embodiment, atmospheric modeling system 502 receives data from one or more data gatherers 508 (e.g., data gathering devices). For example, in an embodiment, data gatherers 508 can include data from a variety of atmospheric databases storing atmospheric data sets, as well as data from devices that gather atmospheric data. For example, data gatherers 508 can include space-based sensors such as satellites and rockets, ground-based sensors, aerial sensors, and water-based sensors. Further, data gatherers 508 can include databases hosting publicly available atmospheric data or non-public atmospheric data that atmospheric modeling system 502 has access to.

In an embodiment, data from data gatherers 508 is transmitted to, and received by, data collator 510 (e.g., a data collator device). In an embodiment, data collator 510 collates the data from data gatherers 508 and weights the data. For example, data from some data gatherers 508 may contain a large amount of data, and data from other data gatherers 508 may contain a comparably smaller amount of data. In an embodiment, data collator 510 can generate weights for received data so that data from one data set does not dominate. In an embodiment, data collator 510 can generate a data pool for the received data and send the data pool to a parameter estimator 512 (e.g., a parameter estimator device).

In an embodiment, parameter estimator 512 can generate parameters for an atmospheric model (e.g., using the procedure described above, with reference to Equations (1)-(8)). For example, in an embodiment, parameter estimator 512 determines an empirical formulation for representing the data from the data pool, including an effective mass profile formulation. In an embodiment, parameter estimator 512 estimates a plurality of key parameters (e.g., based on the formulation). In an embodiment, these key parameters include parameters for the effective mass profile. In an embodiment, parameter estimator 512 tunes the estimated parameters to received data, thereby generating coefficients that can be used by a user 516 (e.g., a human end user and/or a user device). These tuned parameters can be stored in a database (e.g., in memory 506) and/or sent to a client (e.g., a client device) 514.

In an embodiment, user 516 can send commands and/or queries to client device 514 for atmospheric data and can receive output from atmospheric modeling system 502 in response. For example, in an embodiment, user 516 can input a latitude, longitude, day of the year, the solar flux, and/or geomagnetic activity. In an embodiment, based on this user input and data from parameter estimator 512, client 514 can generate a temperature at the exosphere, temperature for a plurality of altitudes, major species (e.g., He, O, $N_2$, $O_2$, and H) and/or a total mass density of the major species.

In an embodiment, atmospheric modeling system 502 only considers data sets from data gatherers 508 that have met a predetermined standard of reliability (e.g., data sets that have been sufficiently vetted in peer reviewed scientific literature and are well documented). In an embodiment, to have any influence over the model parameter estimates created by atmospheric modeling system 502, the number of observations in data from a data gatherer (e.g., data gatherer 508a) must be statistically significant as compared to data from other data gatherers 508.

Components of atmospheric modeling system 502 can be implemented using hardware, software, and/or a combination of hardware and software. Further, components of atmospheric modeling system 502 can be implemented using a single device or using multiple devices. In an embodiment, components of atmospheric modeling system 502 are implemented using one or more computer programs executing on a general purpose computer. In an embodiment, components of atmospheric modeling system 502 are implemented using one or more computer programs executing on a special purpose computer. In an embodiment, components of atmospheric modeling system 502 are implemented using a single special purpose device (e.g., a stand-alone special purpose device or a special purpose device implanted into a host device, such as a host computer). In an embodiment, components of atmospheric modeling system 502 are implemented using a plurality of devices (e.g., in an embodiment, client 514 is implemented using a separate device from the device implementing data collator 510 and parameter estimator 512). In an embodiment, processor 504 and/or memory 506 can be implanted on the device used to implement components of atmospheric modeling system 502 or can be implemented using a separate device (e.g., in a host computer).

9. EXEMPLARY METHODS FOR CREATING AND USING ATMOSPHERIC MODELS

Figure 6:
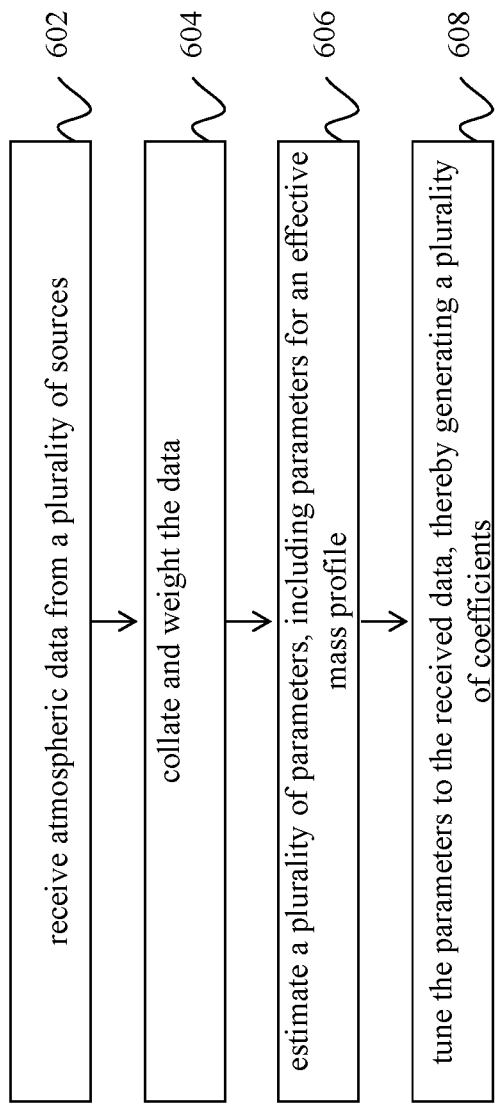
FIG. 6 is a flowchart of an exemplary method for creating an atmospheric model in accordance with an embodiment of the present disclosure.

FIG. 6 is a flowchart of an exemplary method for creating an atmospheric model in accordance with an embodiment of the present disclosure. In step 602, atmospheric data is received from a plurality of sources. For example, in an embodiment, data collator 510 receives atmospheric data from data gatherers 508. In step 604, the data is collated and weighted. For example, in an embodiment, data collator 510 collates and weights the data received from data gatherers 508 (e.g., based on statistical significance). In step 606, a plurality of parameters are estimated, including parameters for an effective mass profile. For example, in an embodiment, parameter estimator 512 estimates the parameters based on data from data collator 510 (e.g., using the equations described above). In step 608, the parameters are tuned to the received data, thereby generating a plurality of coefficients. For example, in an embodiment, parameter estimator 512 can tune the parameters to the received data. In an embodiment, using the parameters, client 514 can receive input from user 516 (e.g., containing a latitude, longitude, day of the year, the solar flux, and/or geomagnetic activity) and can generate a corresponding output (e.g., a temperature at the exosphere, temperature for a plurality of altitudes, major species, and/or a total mass density of the major species) based on the parameters and the input.

10. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An atmospheric modeling device, comprising:
    a data collator configured to:
        receive atmospheric data from a plurality of sources, and
        collate and weight the data; and
    a parameter estimator configured to:
        estimate a plurality of parameters, wherein the plurality of parameters includes parameters for an effective mass profile, and tune the parameters to the data, thereby generating a plurality of coefficients.

2. The atmospheric modeling device of claim 1, wherein the data collator is configured to weight the data based on statistical significance of data from each source in the plurality of sources.

3. The atmospheric modeling device of claim 1, further comprising:
a client, wherein the client is configured to:
receive an input from a user, and
generate, based on the input and the plurality of coefficients, an output comprising an exosphere temperature, a plurality of temperatures at a plurality of altitudes, a plurality of major species in the air, and a total mass density of the major species.

4. The atmospheric modeling device of claim 3, wherein the input comprises a latitude, a longitude, a day of the year, a solar flux, and information regarding geomagnetic activity.

5. The atmospheric modeling device of claim 1, wherein the parameter estimator is further configured to:
determine an empirical formulation for representing the data, wherein the empirical formulation includes an effective mass profile formulation for the effective mass profile; and
estimate the plurality of parameters based on the empirical formulation.

6. The atmospheric modeling device of claim 1, wherein the effective mass profile identifies a transition from a first point in an altitude where major species in the air are mixed to a second point in the altitude where the major species are diffusive.

7. The atmospheric modeling device of claim 1, wherein the parameter estimator is configured to generate an effective mass profile based on parameters for the effective mass profile, and wherein the mass profile is C2 continuous.

8. A method, comprising:
receiving, using an atmospheric modeling device, atmospheric data from a plurality of sources, and
collating, using the atmospheric modeling device, the data;
weighting, using the atmospheric modeling device, the data;
estimating, using the atmospheric modeling device, a plurality of parameters, wherein the plurality of parameters includes parameters for an effective mass profile; and
tuning the parameters to the data, thereby generating a plurality of coefficients.

9. The method of claim 8, wherein weighting the data further comprises weighting the data based on statistical significance of data from each source in the plurality of sources.

10. The method of claim 8, further comprising:
receiving an input from a user; and
generating, based on the input and the plurality of coefficients, an output comprising an exosphere temperature, a plurality of temperatures at a plurality of altitudes, a plurality of major species in the air, and a total mass density of the major species.

11. The method of claim 10, wherein the input comprises a latitude, a longitude, a day of the year, a solar flux, and information regarding geomagnetic activity.

12. The method of claim 8, further comprising:
determining an empirical formulation for representing the data, wherein the empirical formulation includes an effective mass profile formulation for the effective mass profile; and
estimating the plurality of parameters based on the empirical formulation.

13. The method of claim 8, wherein the effective mass profile identifies a transition from a first point in an altitude where major species in the air are mixed to a second point in the altitude where the major species are diffusive.

14. The method of claim 8, further comprising generating an effective mass profile based on parameters for the effective mass profile, wherein the mass profile is C2 continuous.

15. An atmospheric modeling device, comprising:
a data collator configured to:
receive atmospheric data from a plurality of sources,
collate the data, and
weight the data based on statistical significance of data from each source in the plurality of sources;
a parameter estimator configured to:
determine an empirical formulation for representing the data, wherein the empirical formulation includes an effective mass profile formulation for the effective mass profile, and wherein the effective mass profile identifies a transition from a first point in an altitude where major species in the air are mixed to a second point in the altitude where the major species are diffusive,
estimate, based on the empirical formulation, a plurality of parameters, wherein the plurality of parameters includes parameters for an effective mass profile, and
tune the parameters to the data, thereby generating a plurality of coefficients; and
a client, wherein the client is configured to:
receive an input from a user, and
generate, based on the input and the plurality of coefficients, an output comprising an exosphere temperature, a plurality of temperatures at a plurality of altitudes, a plurality of major species in the air, and a total mass density of the major species.

16. The atmospheric modeling device of claim 15, wherein the parameter estimator is configured to generate an effective mass profile based on parameters for the effective mass profile, and wherein the mass profile is C2 continuous.

17. The atmospheric modeling device of claim 16, wherein the effective mass profile is configured to provide a seamless representation of densities of the major species.

18. The atmospheric modeling device of claim 16, wherein the effective mass profile approximates a logistic function.

19. The atmospheric modeling device of claim 15, wherein the parameter estimator is further configured to generate a density profile and a temperature profile.

20. The atmospheric modeling device of claim 19, wherein the density profile is decoupled from the temperature profile.

* * * * *